United States Patent [19]

Ogata et al.

[11] Patent Number: 4,611,314

[45] Date of Patent: Sep. 9, 1986

[54] METHOD FOR ACCESSING TO A ROTATING RECORD MEDIUM AND AN ACCESS CONTROL SYSTEM

[75] Inventors: Mikito Ogata; Masahito Mori, both of Odawara; Takashi Doi, Hadano; Michio Miyazaki, Odawara, all of Japan

[73] Assignee: Hitachi, Ltd., Tokyo, Japan

[21] Appl. No.: 483,175

[22] Filed: Apr. 8, 1983

[30] Foreign Application Priority Data

Apr. 16, 1982 [JP] Japan .................................. 57-63294

[51] Int. Cl.[4] ............................................. G11B 7/013
[52] U.S. Cl. ........................................ 369/32; 369/48; 369/54; 369/59; 369/111; 371/10
[58] Field of Search ....................... 369/44, 47, 48, 54, 369/58, 59, 111, 109, 124, 32; 396/76 L; 365/200, 215; 371/10; 360/78; 358/342

[56] References Cited

U.S. PATENT DOCUMENTS

| | | | |
|---|---|---|---|
| 4,054,921 | 10/1977 | Tatami | 360/36.2 |
| 4,145,758 | 3/1979 | Drexler et al. | 365/200 X |
| 4,225,873 | 9/1980 | Winslow | 358/342 |
| 4,308,612 | 12/1981 | Miyauchi et al. | 369/48 |
| 4,363,116 | 12/1982 | Kleuters et al. | 369/47 X |
| 4,433,403 | 2/1984 | Baba et al. | 369/48 |
| 4,443,870 | 4/1984 | Hazel et al. | 369/44 |

Primary Examiner—Donald McElheny, Jr.
Attorney, Agent, or Firm—Antonelli, Terry & Wands

[57] ABSTRACT

In an information storage system including a rotating recording medium having a number of information tracks, a head positioning mechanism for switching access position between adjacent tracks and a plurality of buffer memories each capable of storing one track of data, an alternate record area for storing data in substitution for an error data block is provided at an end of each of the tracks of the recording medium, and if an error data block is detected by a read-after-write check of the data during the rotation of the disc after the data has been written in one of the tracks from one of the buffer memories during the previous rotation of the disc, the data from the other buffer memory is written in the adjacent track or the data is read from the adjacent track and checked during a disc rotation waiting time required before the data write operation to the alternate record area is started.

24 Claims, 8 Drawing Figures

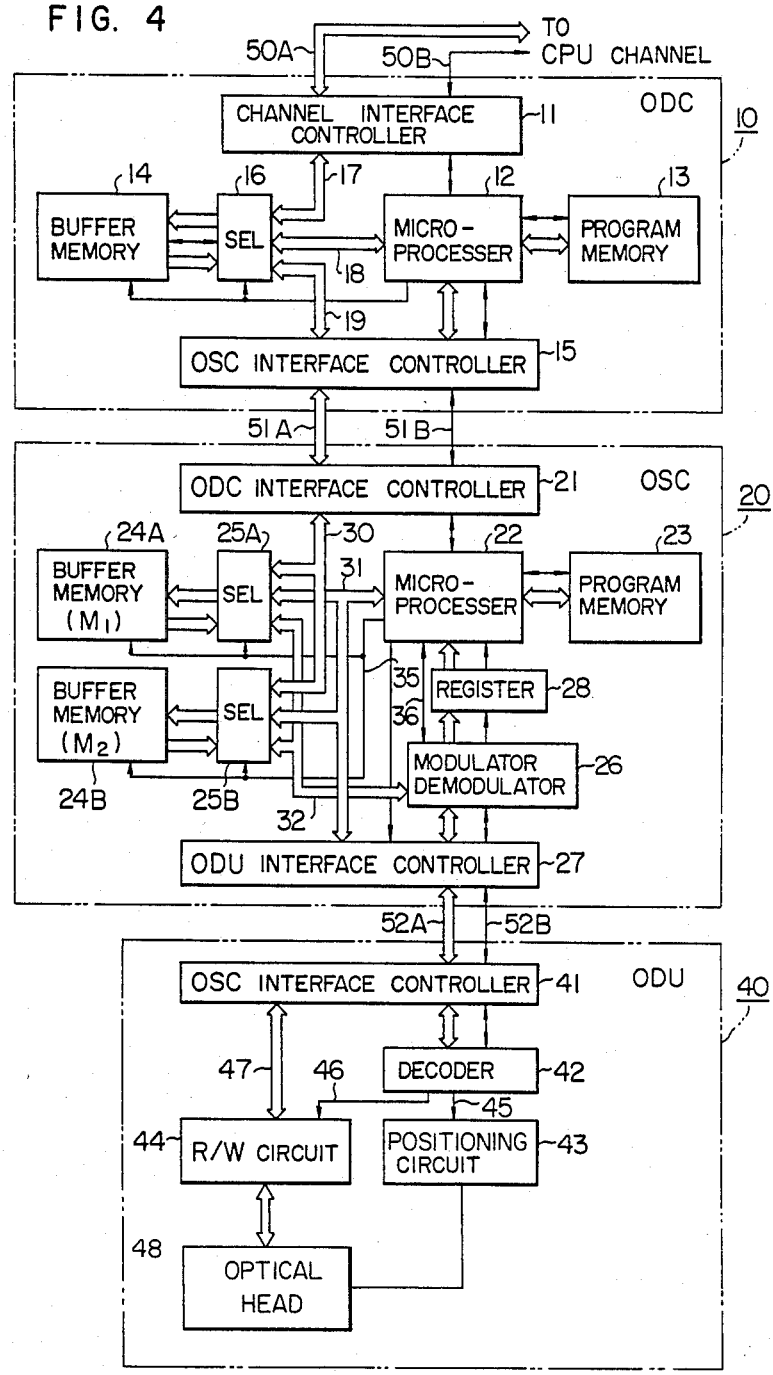

METHOD FOR ACCESSING TO A ROTATING RECORD MEDIUM AND AN ACCESS CONTROL SYSTEM

BACKGROUND OF THE INVENTION

1. Field of the Invention

The present invention relates to a method for accessing a record medium, and more particularly to an improvement in access control in a rotating storage device used as an external storage device of a computer system which uses a rotating record medium having a number of information recording tracks.

2. Description of the Prior Art

In writing data in a magnetic disc device, a plurality of data blocks are written on the magnetic disc and the data blocks are read immediately thereafter to check if the data has been correctly written. If an error data block is detected by the read-after-write check, a magnetic head is positioned to an alternate block position in order to write a correct data block to replace the error data block. In the magnetic disc, the alternate block is located in an alternate track which is different from a group of tracks in which normal data blocks are located. Accordingly, an significant time is taken for the movement of the magnetic head from the normal track in which the error clock is located to the track in which the alternate block is located. After the data has been written in the alternate block and the correct writing has been confirmed by the read-after-write check, the magnetic head is again positioned at the track in which the error block is located and the read-after-write check is resumed from the data block next to the error block.

The reason for concentrating the alternate blocks in the particular track in the magnetic disc device in spite of a long access time required is that the magnetic disc device has a very high reliability and the occurrence of an error block is very rare.

On the other hand, an optical disc device has recently been used as a large capacity external storage device of the computer system. In the optical disc device, a laser beam modulated with data is directed to a metal film formed on a disc surface to form apertures called pits to write the data, and in reading the data, a weak laser beam is directed to the metal film and the presence or absence of the pits is sensed by a change in reflected light intensity. In the optical disc, the formation of the pits is subject to variation by the deterioration of a laser light source, focusing technology of the laser beam to the metal film and a condition of the metal film of the record medium. Accordingly, the probability of error in writing the data is higher than that of the magnetic disc. Thus, if the accessing method utilized in the prior art magnetic disc is employed in the optical disc device, the relocation of the head to the alternate block by the occurrence of a write error frequently occurs and the data processing efficiency is materially reduced.

SUMMARY OF THE INVENTION

It is an object of the present invention to provide a recording method and system which are efficient for writing information onto a recording medium, such as an optical disc, and for checking the written information.

It is another object of the present invention to provide a recording method and system for an optical disc which are effective for writing correct information onto an alternate record area, writing information onto a normal record area and checking these written informations, without unnecessary rotations of the optical disc.

It is still another object of the present invention to provide an optical recording method and system capable of writing information onto a track of an optical disc before checking for errors in information written at a prior time in the alternate record area in an adjacent track of the optical disc.

To achieve the above objects, in accordance with one aspect of the present invention, there is provided an optical, disc-shaped recording medium on which is defined a plurality of tracks each having a normal record area including a plurality of data areas to be first accessed when data is written therein and read out therefrom and an alternate record area including at least one alternate area which serves to store data therein in place of defective data blocks present in the normal record area.

An optical disc unit according to the present invention comprises an optical head for applying a light beam onto a recording medium when optically writing data and reading out stored data, a read/write circuit for writing data onto the medium and reading out data from the medium, and a positioning circuit for moving the optical head so as to position the light beam outputted therefrom to a selected track.

According to the present invention, there is provided a control unit for controlling the optical disc unit. This control unit comprises at least two buffer memories for storing data to be written onto the medium and a selector for selecting either one of these two buffer memories, and data from the selected buffer memory selected by the selector is supplied to the read/write circuit. These two buffer memories contribute to improvement in speed in continuously writing data onto the medium. This control unit further serves to effect functions of checking data in order to detect errors present in the data read out of the normal record area and alternate record area, controlling the read/write circuit so that correct data is written onto the alternate record area of a first track and, subsequently writing further data supplied from either one of said two buffer memories onto the normal record area of a second track adjacent to said first track, issuing a command to the positioning circuit to position the light beam from the optical head to the first track so that the data written onto the alternate record area of the first track is checked after said further data has been written onto the normal record area on the second track.

During a first rotation of the disc medium, data transferred from the buffer memory is written onto the normal record area of a given first track. During a next rotation or the second rotation of the disc medium, the data written onto this normal record area is read out, and errorroneous data is detected to check if the data has been correctly written. Depending on the result of this check, if some error is detected to be present, new data is written onto the alternate record area of the first track. This checking operation and writing operation onto the alternate record area are preferably carried out during the second rotation of the disc medium. The important point here is to check to see if the data has been really correctly written on the alternate record area. For this reason, the data which has been written onto the alternate record area of the first track has to be read out, and accordingly, normally, this reading out operation will have to wait during a period of the next rotation, i.e., during the period of a third rotation of the medium. However, according to the present invention, it is possible to use this third rotational period of the disc medium instead of wasting it. Namely, during this third period, further data sent from the buffer memory is written onto the normal record area in a second track adjacent the first track. And subsequently, the control unit controls the positioning circuit to move the optical head so that the light beam is positioned from the second track to the alternate record area of the first track and the data is read out from the alternate area and checked.

The above-mentioned series of operations is sequentially repeated over a plurality of tracks provided on the disc medium to record data on the disc medium These and other objects, features and advantages of the present invention will become more apparent by referring to the following description and accompanying drawings.

BRIEF DESCRIPTION OF THE DRAWINGS

FIG. 4 is a block diagram of a control system for implementing the above access method.

DESCRIPTION OF THE PREFERRED EMBODIMENTS

Data recording and reproduction to and from an optical disc are first explained. In the optical disc, a layer of UV resin is formed on a surface of a circular substrate made of glass or plastic material and a number of concentric or spiral grooves are formed in the surface of the UV resin layer. These grooves are formed in order to discriminata tracks on which information is to be recorded from other areas on the disc by a difference of light reflection. On the surface of the UV resin including the grooves, a thin metal film is formed that is partially molten to form a pit when a laser beam of high intensity is impinged thereon, and reflects a laser beam when a laser beam of a weak intensity is impinged thereon.

Accessing to the track or the optical disc is typically carried out by an optical head which comprises a semiconductor laser element, an optical system which condenses the light beam emitted from the laser element and directs it normally to the surface of the optical disc, and separates a reflected light component which varies with presence or absence of the pit and presence or absence of a groove, and an automatic focusing mechanism which adjusts the position of an object lens in a direction normal to an optical axis in accordance with a focus error signal detected from the reflected light to focus the laser beam on the disc surface.

The optical head is mounted on a swing arm type or linear drive type actuator in the same manner as a magnetic head in a magnetic disc device, and the actuator is driven radially of the disc so that the optical disc is positioned to a desired track. When a tracking operation to a target track is to be attained by a single actuator which covers all tracks, control of the actuator is difficult to attain. Accordingly, a two-step position control is used, in which a tracking mirror disposed in front of the object lens is utilized to coarsely position the actuator and the angle of inclination of the mirror is finely adjusted to exactly position the light spot to the target track. The details of the tracking method are described in Japanese patent application No. 187869/81 (corresponding to EPC application No. 821109071, U.S. Ser. No. 443,399) filed in the name of Hitachi.

Figure 1:
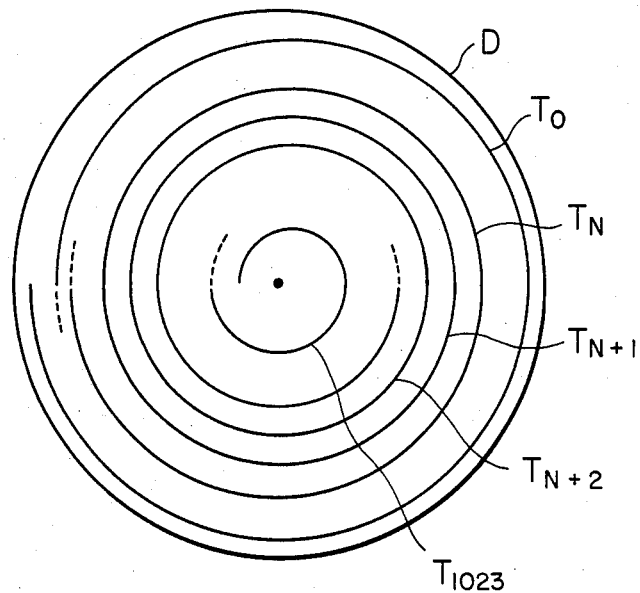
FIG. 1 is a diagram illustrating tracks of an optical disc.

FIG. 1 shows a disc D having spirally arranged tracks. For example, 1024 tracks are formed on each side of the disc D and they are designated by track $0(T_0)$, track $1(T_1)$, ..., track $1023(T_{1023})$, in a direction from an outer periphery to the center of the disc D.

Figure 2:
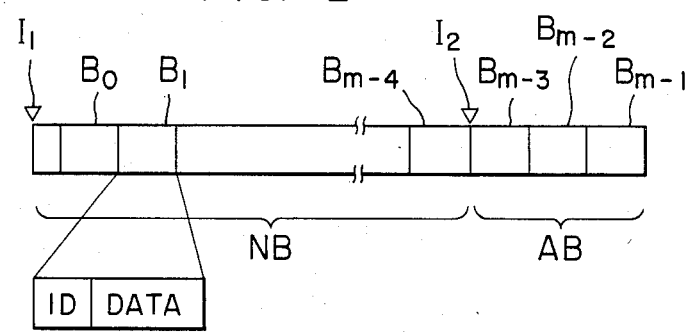
FIG. 2 is a diagram showing a record format in one track.

FIG. 2 shows a record format in one track. Each track includes m blocks $B_0, B_1, \ldots, B_{m-1}$ and each of the blocks includes an ID field and a data field. The ID field has information indicating a physical position (track number and block number) of the block previously recorded thereon. It is read out to identify the block to start the writing of data to the data field. The data field can record, for example, 512-byte data, error correction codes and error detection codes associated with the data.

In the present invention, the blocks $B_0-B_{m-4}$ of each track are defined as a normal record area NB in which normal user data are to be written, and the remaining blocks $B_{m-3}-B_{m-1}$ are defined as an alternate record area AB in which data is to be written in substitution for an error block if a write error is detected in the tracks. The number of data blocks assigned to the alternate record area AB may be determined by reliability of the recording medium D and the recording system and it may be one in an extreme case. Usually, index information $I_1$ and $I_2$ are recorded at the beginnings of the normal record area NB and the alternate record area AB, respectively. These indexes may be replaced by the block numbers contained in the ID fields in the blocks $B_0$ and $B_{m-3}$, respectively.

In the present invention, the disc control unit has at least two buffer memories $M_1$ and $M_2$ each having one track of data storage capacity, and the buffer memories are selected and the track being accessed is switched to the adjacent track in response to the detection of the index information so that a plurality of tracks of data are written on the optical disc at a high speed.

Figures 3A, 3B:
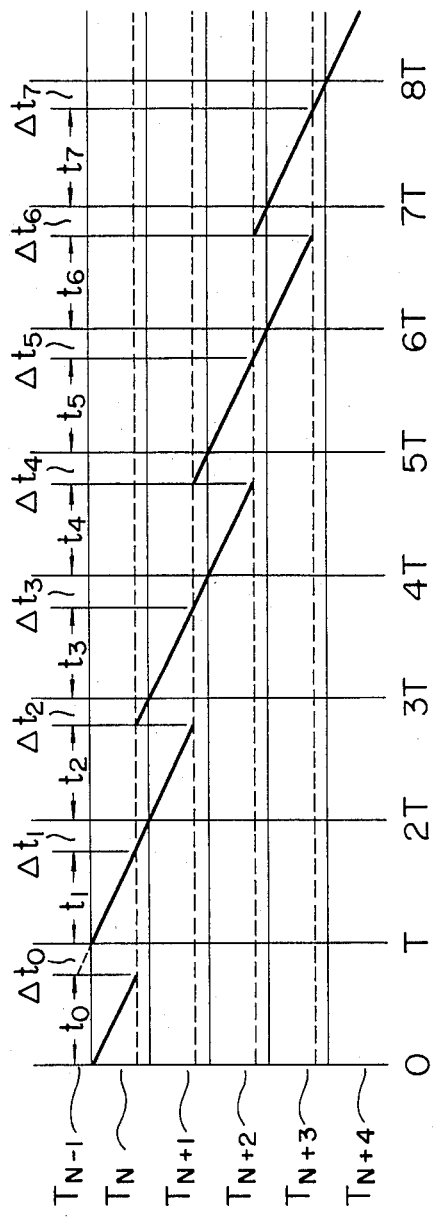
FIGS. 3A and 3B are diagrams showing a timing signal chart and an access sequence in one embodiment of the access method of the present invention.

Referring to FIGS. 3A and 3B, a first embodiment of the accessing system of the present invention is now described.

In FIG. 3A, the abscissa represents a time axis, INDEX shows the indexes $I_1$ and $I_2$ which are periodically detected as the disc is rotated, $S_1$ shows a switching timing for write operation W and read operation R, $S_2$ shows a switching timing for the buffer memories $m_1$ and $M_2$, and $S_3$ shows a switching timing for jumping the head position by one track from the track being accessed to the outer adjacent track.

By those signals, the data write operation and the read-after-write check operation are repeated on the optical disc as shown in FIG. 3B, in which $T_N$, $T_{N+1}$, ... $T_{N+4}$ denote the track numbers, 0, T, 2T, ... 8T denote rotation periods of the disc, to $t_0, t_1, \ldots t_7$ denote access times to the normal record areas NB in the respective tracks and $\ominus t_0, \Delta t_1, \ldots \Delta t_7$ denote access times to the alternate record areas in the respective tracks, and diagonal solid lines represent head access positions.

In the illustrated example, the write operation starts at the track $T_N$, the data in the buffer memory $M_1$ is written in the data areas of the normal record area in the time period $t_0$, and when the index $I_2$ is detected, the head is jumped to the outer track by the timing signal $S_3$ so that the read operation is started. Since the write operation has been started from the track $T_N$, the data on the track $T_{N-1}$ read in the time period $\Delta t_0$ is insignificant. After the time period $\Delta t_0$, the head accesses the normal record area NB on the track $T_N$ because the tracks are spiral and the tracks $T_{N-1}$ and $T_N$ are physically continuous. As a result, in the time period $t_1$, the data written in the time period $t_0$ is read and an error is checked.

When the index $I_2$ on the track $T_N$ is detected, the operation is switched from the read operation to the write operation by the timing signal $S_1$. If an error is detected in the data block is the normal record area NA on the track $T_N$ in the period $t_1$, a new data block is formed in the next time period $\Delta t_1$ in place of the data block in which is found the error, and the new data block is written in the alternate block on the track $T_N$. In this connection, error in the data block is detected by checking the data read out from the normal record area NA by using a well-known ECC (error check code).

When the head reaches the track $T_{N+1}$, the data in the buffer memory $M_2$ is read in response to the detection of the index $I_1$, and in the time period $t_2$ the data is written in the normal record area NB on the track $T_{N+1}$. When the index $I_2$ on the track $T_{N+1}$ is detected, the head is again jumped by one track and the operation is switched to the read operation. The head now accesses the alternate record area AB on the track $T_N$ and reads the alternate block previously written and an error is checked. After the read-after-write check of the alternate block, the content of the buffer memory $M_1$ is no longer necessary and the data to be written to the next track $T_{N+2}$ is stored in the memory $M_1$. In and after the time period $t_3$, the above operations are repeated.

In the present embodiment, the data of the next track is written between the writing of the data to the alternate block of the track and the read-after-write check. Accordingly, one disc rotation of time per track is saved to compare with a case where the writing of the data to the next track is started after the processing for the track has been completed.

FIG. 4 shows a configuration of a control system for implementing the above access method. In the present embodiment, the control system comprises a control unit (ODC) 10 connected to a CPU channel, an optical disc unit (ODU) 40 which includes a disc and a head mechanism, and a control unit (OSC) 20 arranged between the above two units.

The ODC 10 responds to a data write command and a data read command from the channel to control the OSC 20, and it comprises a channel interface controller 11 connected to the channel through a bus 50A and a control line 50B, a microprocessor 12 for controlling the operation of the ODC 10, a memory 13 which contains microprograms necessary for control operations to be executed by the microprocessor 12, a buffer memory 14 for temporarily storing transmission/reception data, an OSC interface controller 15 connected to the OSC 20 through a data bus 51A and a control line 51B, and a selector 16. The selector 16 functions to selectively connect the buffer memory 14 to either one of a bus 17 connected to the channel interface controller 11, a bus 18 connected to the microprocessor or a bus 19 connected to the OSC interface controller. As a result, the data input/output path is switched between the CPU channel and the OSC 20.

The OSC 20 responds to commands, such as a data write command and a data read command from the ODC 10 to control the ODU 40. It comprises an ODC interface controller 21, a microprocessor 22 for controlling the overall operation of the unit 40, a memory 23 for storing microprograms necessary to control the microprocessor 22, two buffer memories ($M_1$) 24A and ($M_2$) 24B each having at least one track of data storage capacity, selectors 25A and 25B for selecting input/output buses of the buffer memories, a modulator/demodulator for modulating the write data to the optical disc and demodulating the read data, an ODU interface controller 27 connected to the ODU 40 through a bus 52A and a control line 52B and a register 28 to which the ID information read from the optical disc is registered. The selectors 25A and 25B are connected to a bus 30 which is connected to the ODC interface controller 21, a bus 31 which is connected to the microprocessor 22 and a bus 32 which is connected to the modulator/demodulator 26. The bus selection by the selectors 25A and 25B and the read/write designation of the buffer memories 24A and 24B are carried out by a control signal 35 from the microprocessor 22. The selection signal S2 shown in FIG. 3A corresponds to the control signal 35. The modulator/demodulator 26 has an ECC check function which indicates any error in the read data block to the microprocessor 22 through a signal line 36. In this connection, as the microprocessor 22, any commercially available microprocessor having an appropriate processing capability may be used.

The ODU 40 comprises an OSC interface controller 41 connected to the bus 52A and the control line 52B, a decoder 42, a positioning circuit 43, a read/write circuit 44 and an optical head 48. The positioning circuit 43 drives a tracking mirror for an optical head 48 by a control signal 45 corresponding to the timing signal S3 to jump the access position by one track inwardly or outwardly. The read/write circuit 44 switches a laser element drive current by a control signal 46 corresponding to the timing signal S1 so that a weak light beam is emitted in the read mode and a strong light beam modulated by the data is emitted in the write mode. Numeral 47 denotes a bus for the write data and the read data. In this connection, the construction of the ODU 40 including the positioning circuit 43 and the optical head 48 is disclosed in detail in U.S. Application Ser. No. 443,399, fled on Nov. 22, 1982, and assigned to the same assignee as the present application.

Figure 5:
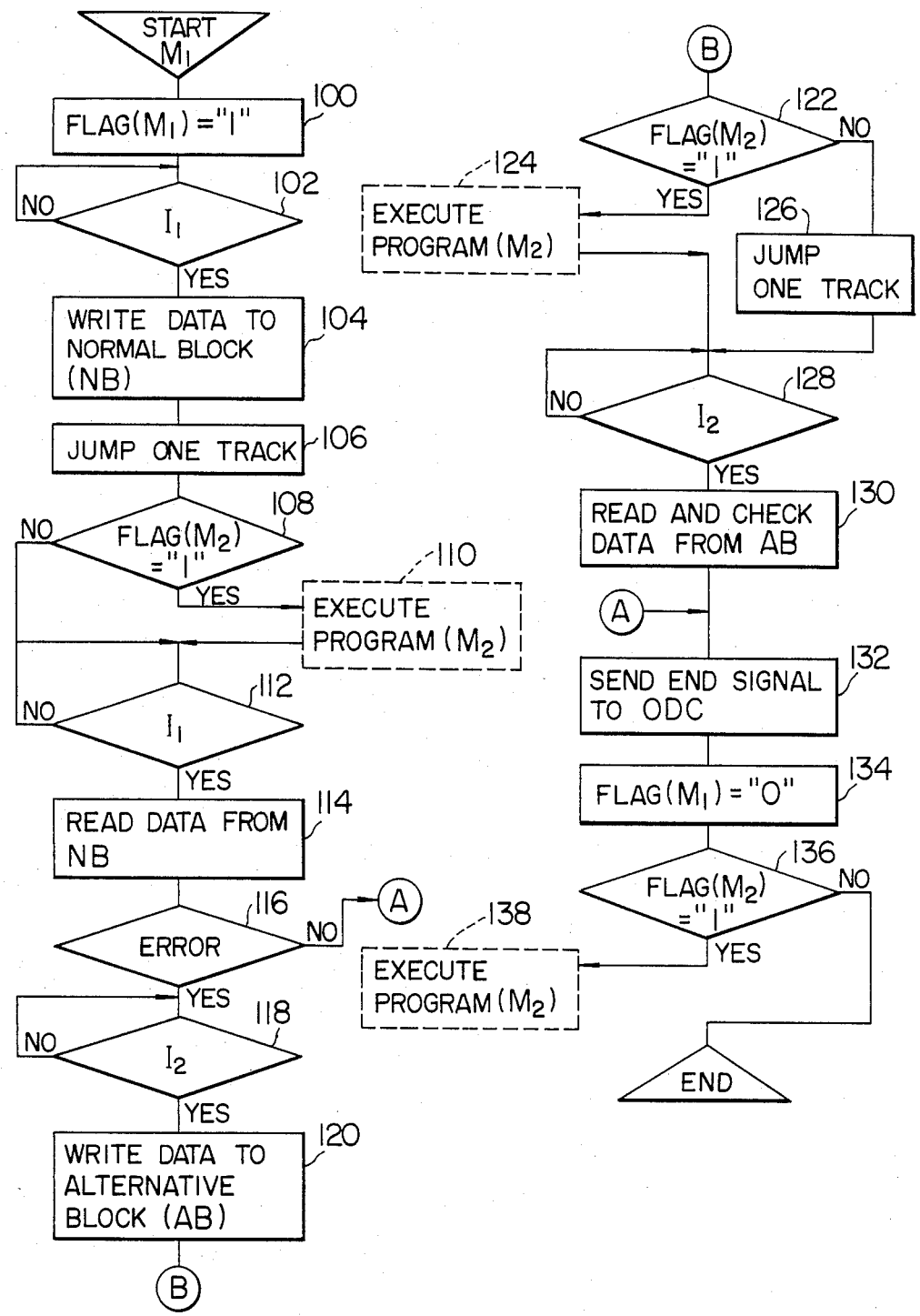
FIG. 5 is a diagram showing a flow chart of a program executed by a microprocessor 22 in the above control system to implement the above access method.

In the control system described above, in order to carry out the access control described in FIG. 3B, the microprocessor 22 of the OSC 20 executes a program shown in FIG. 5 which is prepared for the buffer memories $M_1$ and $M_2$.

FIG. 5 shows a program for controlling the data in the buffer memory $M_1$. For the sake of explanation, the program of FIG. 5 is designated by program ($M_1$) and a program for the other buffer memory $M_2$ is designated by program ($M_2$).

When one track of data is prepared in the buffer memory 24A by the ODC 10 and the program ($M_1$) is started, a flag ($M_1$) is set to "1" to indicate that the program is under execution (step 100). When an ID corresponding to the index I₁ is set in the register 28 (step 102), the data is read out of the buffer memory M₁ and supplied to the ODU. Thus, the data is written in the normal record area NB in the time period t₀ shown in FIG. 3B (step 104). After the write operation, a one track jump command is issued (step 106) and the execution status of the program (M₂) for the other buffer memory M₂ is checked by a flag (M₂) (step 108). If the flag (M₂) is "1", the program (M₂) is executed (step 110). If the flag (M₂) is "0" or the return to the program (M₁) from the program (M₂) is commanded, the arrival to the index I₁ position is checked (step 112) and the read operation is started (step 114). This corresponds to the operation in the time period t₁ of FIG. 3B. If no error block is detected in the read-after-write check (step 116), the process goes to a step 132 where the end of operation is indicated to the ODC 10, and the flag (M₁) is reset to "0" (step 134). Thereafter, the flag (M₂) is checked (step 136) and if the flag (M₂) is "1" the program (M₂) is executed and if it is "0" the program (M₁) is terminated.

If an error block is included in the normal record area at the step 116, the process advances to a step 118 where the index I₂ is checked and the data for the error block is written (step 120). This corresponds to the operation in the time period Δt₁ of FIG. 3B. After the write operation, the flag (M₂) is checked (step 122) and if it is "1", the program (M₂) is executed (step 124). If the flag (M₂) is "0", the one-track jump command is issued (step 126), and after the index I₂ has been detected (step 128), the read operation is started (step 130). Thus, the operation in the time period Δt₂ of FIG. 3B is carried out. After the read operation, the process advances to a step 132 where the end of operation is reported.

In the above flow chart, the steps 100-108 are executed for the program (M₂) in the step 124, the steps 112-126 are executed for the program (M₂) in the step 138, and the steps 128-136 are executed for the program (M₂) in the step 110.

Figure 6A:
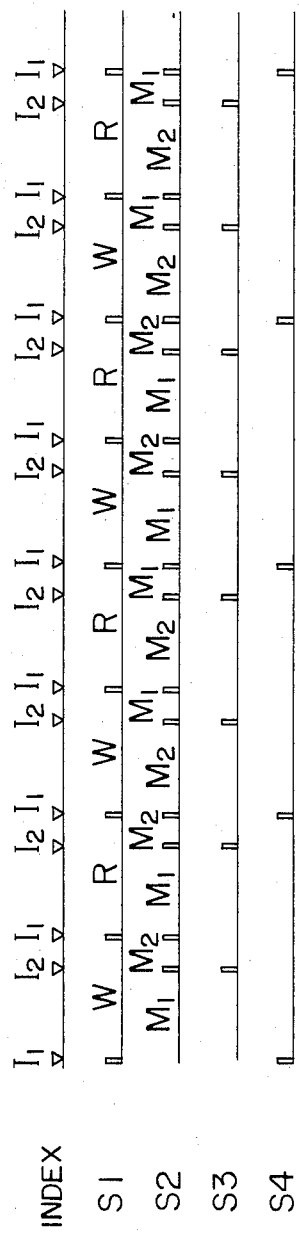
FIGS. 6A and 6B are diagrams showing a timing signal chart and an access sequence in another embodiment of the present invention.
Figure 6B:
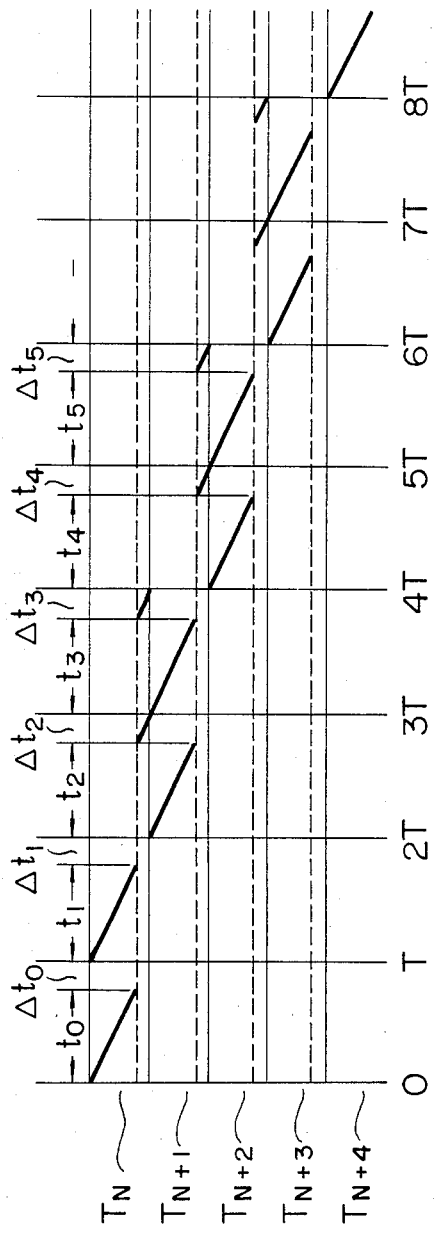

FIGS. 6A and 6B show another embodiment of the present invention. In the present embodiment, the data is written in the normal record area NB during the first rotation of the disc, the data is read from the normal record area NB and checked during the second rotation of the disc, the data is written in the alternate record area AB during the third rotation of the disc, and the data is read from the alternate record area AB and checked during the fourth rotation of the disc. During a waiting time for the third rotation period, the data is written in the normal record area on the next track, and during a waiting time for the fourth rotation period, the data on the next track is read and checked.

In the present embodiment, the track switching operation of one-track outward and two-track inward movement is required. This is attained by the signal 45 of the ODU. The signal S3 in FIG. 6A shows a jump timing to the outward track and the signal S4 shows a jump timing to the inward track.

In the embodiments described above, the control system has two buffer memories M₁ and M₂ and the data is supplied to the two tracks on the disc in a timedivision fashion. By providing three or more buffer memories and preparing the data for the third track during the access operation to the first and second tracks, the data in the buffer memories can be readily changed. In this method, even if an error block is detected in the alternate record area, there is a sufficient time to rewrite the data.

While the disc having the spirally continuous tracks is used in the above embodiments, the present invention is equally applicable to a disc having concentric separate tracks by merely increasing the number of times of jump between the tracks which occurs in response to the index I₁.

We claim:

1. A method of recording information on a rotatable disc-shaped medium having a plurality of tracks by controlling the position of a recording/reproducing head with respect to said disc-shaped medium, each track of said disc-shaped medium including a normal record area in which to record an information and an alternate record area located on said track behind the normal record area in the direction of disc rotation for recording an information in substitution for an erroneous information recorded in the normal record area of the track, comprising:

recording information in the normal record area of a first track;

detecting an error in the information recorded in the first track by checking the information recorded in the normal record area of said first track;

recording correct information in the alternate record area of said first track when error information is detected in said normal record area of said first track;

recording information in the normal record area of a second track adjacent to said first track after the recording of information in the normal record area of said first track; and detecting an error in the information recorded in the alternate record area of said first track by checking the information recorded in the alternate record area of said first track subsequent to recording information in the normal record area of said second track; and detecting an error in the information recorded in said second track by checking the information recorded in the normal record area of said second track subsequent to checking the information recorded in the alternate record area of said first track.

2. The method according to claim 1, wherein the disc-shaped medium has a spiral track defining a plurality of concentric tracks.

3. The method according to claim 2, wherein said recording/reproducing head is an optical head, and further comprising:

positioning an optical head at the aternate record area of the first track to read information recorded therein after recording the information in the normal record area of said second track.

4. The method according to claim 3, further comprising detecting index information provided at least at the beginning of the alternate record area of each track; and positioning the optical head to the first track after detection of the index information at the beginning of the alternate record area of the second track.

5. A method of recording information on a rotatable optical disc-shaped medium having a plurality of tracks, each track including a normal record area to write and read information and an alternate record area for recording information in substitution for erroneous information recorded in the normal record area of the track, comprising:

providing information storage means in the form of a first memory and a second memory, each memory having a storage capacity to store at least one track of information;

writing information read from said first memory in the normal record area of first track of said medium;

reading the information already written in the normal record area of said first track to detect the presence of an error in the information;

storing information from an information source in said second memory;

writing information in the aternate record area of said first track according to the detection of an error in the information recorded in the normal record area of said first track;

switching from said first memory to said second memory to read information therefrom;

writing information read from said second memory in the normal record area of a second track adjacent to said first track by moving an optical head continuously from said first track to said second track although the writing of information in the alternate record area of said first track changes to the writing of information in the normal record area of the second track; and shifting the optical head from the second track to the alternate record area of the first track to read the information from the alternate record area of the first truck to detect the presence of an error in that information after writing information in the normal record area of the second track.

6. A method of recording information on a rotatable optical disc-shaped medium having a plurality of tracks, each track including a plurality of normal record areas for recording of information blocks therein and at least one alternate record area for reading an information block in substitution for an erroneous information block in a normal record area of the track, the method comprising:

writing information blocks in the normal record area of a first track during a first rotation of the medium;

reading the information blocks from said normal record area of said first track during a second rotation of the medium next following the first rotation;

detecting an erroneous information block by checking the information blocks read from said normal record area of said first track during the second rotation of the medium;

writing a correct information block in the alternate record area of said first track during the second rotation of said medium when there is detected an erroneous information block in a normal record area of the first track;

writing information blocks in the normal record area of a second track adjacent said first track during a third rotation of the medium next following the second rotation; and reading the information block from said alternate record area of said first track to detect an erroneous information block by checking the information block after writing information blocks in the normal record area of said second track.

7. The method according to claim 6, wherein the information block from said alternate record area of said first track is read during the third rotation of the medium, and further comprising reading the information block from said normal record area of the second track to detect the erroneous information block therein during a fourth rotation of the medium next following the third rotation.

8. The method according to claim 6, wherein said optical disc-shaped medium has a spiral track defining a plurality of concentric tracks, and wherein each alternate record area is located behind the normal record areas in the direction of rotation of the medium.

9. The method according to claim 8, further comprising shifting an optical head from said second track to said first track in order to read the information block from the alternate record area of said first track during the third rotation of the medium.

10. The method according to claim 9, further comprising:

providing a first index at the beginning of each track and a second index at the beginning of the alternate record araa of the track; and detecting said first and second indexes during the rotation of the medium; and shifting said optical head to said first track when said second index is detected in said second track.

11. The method according to claim 6, wherein there are provided at least first and second memories to store information therein, each memory having a capacity to store at least one track of information, and further comprising:

supplying the information blocks from said first memory to an optical head in order to write the information blocks in the normal record area of said first track;

storing further information blocks in said second memory at least by the end of the second rotation of the medium; and supplying the information blocks from said second memory to the optical head to write the information blocks in the normal record area of said second track during the third rotation of the medium.

12. The method according to claim 11, switching between reading of information blocks between said first memory and said second memory to supply the information blocks therefrom in response to the detection of said second index of each track.

13. An optical recording system comprising:

(a) a rotatable optical disc-shaped recording medium defining a plurality of tracks, each track including a plurality of normal record area for recording information block therein and at least one alternate record area for recording a corrected information block therein in substitution for an erroneous information block in a normal record area;

(b) means for supplying information blocks to be recorded in the track of the medium;

(c) recording and reproducing means including an optical head for recording information from said supplying means in a track of the medium and for reproducing information which has been recorded in a track of the medium by directing a light beam from said optical head onto the track of the medium;

(d) positioning means for moving the optical head so as to position the light beam on a track; and (e) control means for controlling said supplying means and said positioning means, including means for checking the information reproduced from the normal record area and the alternate record area of the track by way of said reproducing means in order to detect error information, means for controlling said recording means to record correct information in the alternate record area of a first track in substitution for erroneous information detected in the normal record area of that track, for subsequently recording information transferred from said supplying means in the normal record area of a second track next adjacent said first track on the medium and for thereafter issuing a command to said positioning means so as to position the light beam onto said first track to reproduce the information in the alternate record area thereof and to supply the reproduced information to said checking means.

14. The system according to claim 13, wherein said supplying means includes at least two buffer memories to store information therein, and further comprising:
selection means for selecting said buffer memories alternately to read the information therefrom and transfer the information to said recording means.

15. A system for recording information on a rotatable disc-shaped medium having a plurality of tracks, each track including a normal record area to record information therein and an alternate record area located behind the normal record area in the direction of disc rotation for recording information in substitution for an erroneous information recorded in the normal record area, comprising:
means for effecting the recording of information in the normal record area of a first track;
means for detecting an error in recorded information by checking the information recorded in the normal record area of said first track;
means for effecting the recording of correct information in the alternate record area of said first track when error information is detected in said normal record area of said first track;
means for effecting recording of information in the normal record area of a second track adjacent to said first track after the recording of information in the normal record area of said first track; and
means for effecting the detecting of error information by checking the information recorded in the alternate record area of said first track after recording information in the normal record area of said second track.

16. The system according to claim 15, further comprising:
means for positioning an optical head at the alternate record area of the first track to read information recorded therein after recording the information in the second track.

17. The system according to claim 16, further comprising:
means for detecting index information provided at least at the beginning of the alternate record area of each track, said positioning means being responsive to detection of index information at the alternate record are of the second track for positioning the optical head to said first track.

18. A system for recording information on a rotatable optical disc-shaped medium having a plurality of tracks, each track including a plurality of normal record areas for recording information blocks therein and at least one alternate record area for recording an information block in substitution for an erroneous information block in the normal record area, comprising:
means for writing information blocks in the normal record areas of a first track during a first rotation of the medium;
means for reading the information blocks from said normal record areas of said first track during a second rotation of the medium next following the first rotation;
means for detecting an erroneous information block by checking the information blocks read from said normal record areas of said first track during the second rotation of the medium;
means for writing a correct information block in the alternate record area of said first track during the second rotation of said medium when there is detected an erroneous information block in a normal record area of the first track;
means for writing an information block in the normal record area of a second track adjacent said first track during a third rotation of the medium next following the second rotation; and
means for reading the information block from said alternate record area of said first track to detect an erroneous information block by checking the information block after writing information blocks in the normal record area of said track.

19. The system according to claim 18, wherein the information block from said alternate record area of said first track is read during the third rotation of the medium, and further comprising means for reading the information from said normal record area of the second track to detect an erroneous information block therein during a fourth rotation of the medium next following the third rotation.

20. The system according to claim 19, wherein a first index is provided at the beginning of each track and a second index is provided at the beginning of each alternate record area of the track; and further comprising:
means for detecting said first and second indexes during the rotation of the medium and for controllng said shifting means to position said optical head when said second index is detected.

21. The system according to claim 18, wherein said optical disc-shaped medium has a spiral track defining a plurality of concentric tracks, and wherein each alternate record area is located behind the normal record areas of the track in the direction of rotation of the medium.

22. The system according to claim 21, further comprising an optical and means for shifting said optical head from said second track to said first track in order to read the information block from the alternate record area of said first track during the third rotation of the medium.

23. The system according to claim 22, further including first and second memories to store information therein, each memory having the capacity to store at least one track of information;
means for supplying the information blocks from said first memory to said optical head in order to write the information blocks in the normal record area of said first track;
means for storing further information blocks in said second memory at least by the end of the second rotation of the medium; and
means for supplying the further information blocks from said second memory to the optical head to write the further information blocks in the normal record area of said second track during the third rotation of the medium.

24. The system according to claim 23, further including means for switching between reading of information blocks between said first memory and said second memory to supply the information blocks therefrom in response to the detection of said second index of each track.

* * * * *